United States Patent [19]

Drent et al.

[11] Patent Number: 5,359,028

[45] Date of Patent: Oct. 25, 1994

[54] POLYKETONE POLYMERS

[75] Inventors: Eit Drent, Amsterdam, Netherlands; Pen-Chung Wang, Houston, Tex.

[73] Assignee: Shell Oil Company, Houston, Tex.

[21] Appl. No.: 58,725

[22] Filed: May 7, 1993

[30] Foreign Application Priority Data

May 7, 1992 [EP] European Pat. Off. ........ 92201303.2

[51] Int. Cl.$^5$ .............................................. C08G 67/02
[52] U.S. Cl. .................................... 528/392; 528/271
[58] Field of Search ................................. 528/392, 271

[56] References Cited

U.S. PATENT DOCUMENTS

| | | | |
|---|---|---|---|
| 4,489,542 | 7/1989 | Drent | 560/175 |
| 4,940,777 | 7/1990 | Drent | 528/392 |
| 5,049,650 | 9/1991 | Drent et al. | 528/392 |
| 5,116,936 | 5/1992 | Drent et al. | 528/271 |

FOREIGN PATENT DOCUMENTS

2202165A 9/1988 United Kingdom .

*Primary Examiner*—John Kight, III
*Assistant Examiner*—Shelley A. Dodson
*Attorney, Agent, or Firm*—James O. Okorafor

[57] ABSTRACT

Polyketone polymers comprising a repeating structure of the general formula,

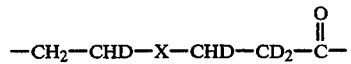

wherein each D, independently, represents a hydrogen atom or an alkyl group of up to 4 carbon atoms and X represents a divalent bridging group of formulas,

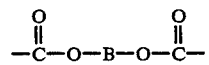

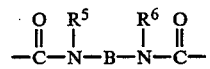

wherein $R^5$ and $R^6$ independently are hydrogen or an alkyl group of up to 4 carbon atoms and B represents an inert divalent bridging group and a process for their preparation. The invention also relates to a novel process for the preparation of these novel polyketone polymers.

8 Claims, No Drawings

POLYKETONE POLYMERS

BACKGROUND OF THE INVENTION

This invention relates to new polyketone polymers and a novel process for the preparation of these new polyketone polymers.

Polyketone polymers, particularly linear alternating polymers of carbon monoxide and an ethylenically or alkenically unsaturated hydrocarbon are very well known in the art. These polymers, in the USA, are proprietary to Shell Oil Company, and will become commercially available as CARILON® thermoplastic polymer. They are now the subject matter of hundreds of patents issued to Shell Oil Company. These patents are exemplified by U.S. Pat. Nos. 5,049,650, and 4,940,777 their disclosures which are herein incorporated by reference.

Polyketone polymers are relatively high molecular weight materials having established utility as thermoplastics in the production of shaped articles by the methods conventionally employed with thermoplastics.

The polyketone polymers, by virtue of the presence of carbonyl groups, are converted into other types of polymer to modify the properties of the polyketone. The carbonyl groups undergo a number of broadly conventional reactions to produce polymeric derivatives such as polyols, polythiols and polyamines. It is desirable to provide polyketone-type polymers with further functional groups. The present invention provides novel polyketone polymers which incorporate further functional groups, and a process of producing such polymers.

SUMMARY OF THE INVENTION

The polyketone polymers, by virtue of the presence of carbonyl groups, can be converted into other types of polymer to modify the properties of the polyketone. The carbonyl groups can undergo a number of conventional reactions to produce polymeric derivatives such as polyols, polythiols, and polyamines. It is desirable, on occasion, to provide polyketone-type polymers with further functional groups. The invention accordingly sets out to provide novel polyketone polymers which incorporate further functional groups, and a process of producing such polymers.

More specifically, the invention provides polyketone polymers comprising a repeating structure of the general formula (I),

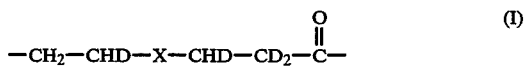

wherein each D, independently, represents a hydrogen atom or an alkyl group of up to 4 carbon atoms and X represents a divalent bridging group of the general formula (III), or of the general formula (IV),

wherein $R^5$ and $R^6$ independently are hydrogen or an alky group of up to 4 carbon atoms and B represents an inert divalent bridging group. X represents, preferably, a bridging group of the general formula (III). Alternatively, X is an optionally substituted aromatic divalent bridging group, suitably, but not restricted to, paraphenylene. Suitably, B represents an alkylene group containing 2-10 carbon atoms, in particular 2-6 carbon atoms. B is preferably an n-alkylene group. Most preferably, B is a 1,4-butylene group.

The molecular weight of the polyketone polymer of this invention may vary between wide limits, dependent on the application envisaged. Suitable it may have a number-average molecular weight between 100 and 100,000, more suitably between 1000 and 50,000.

DETAILED DESCRIPTION OF THE INVENTION

The novel polyketone polymers are generally produced by a process comprising polymerizing carbon monoxide and hydrogen with one or more diolefins of the general formula (V),

wherein X and D have the same meaning as previously disclosed.

The polymerization is carried out in the presence of a catalyst comprising a Group VIII metal, preferably palladium; a bidentate ligand of the general formula $R^1R^2M-R-MR^3R^4$, in which M represents phosphorus, arsenic or antimony with phosphorus being preferred, R represents a divalent organic bridging group having at least two carbon atoms in the bridge, none of these carbon atoms carrying substituents that may cause stearic hindrance, and $R^1$, $R^2$, $R^3$, and $R^4$ are identical or different hydrocarbyl groups; a weakly or non-coordinating anion; and optionally a quinone.

In view of numerous possible side reactions, it is quite surprising that the polymers of substantial molecular weight can be prepared in accordance with the process of the present invention. For instance, instead of the polymerization/propagation reaction, the reaction could proceed (and terminate) via hydrogenation, hydroformylation (substitution by carbon monoxide and hydrogen), and/or hydrogenolysis (chain scission by hydrogen substitution), which reactions would lead to low molecular weight polymeric material.

It is noted that the occurrence of the above propagation reaction depends on the composition of the monomer feed (for instance the ratio of $CO/H_2$/olefinically unsaturated monomer, which for a diolefin is ideally a 2/2/1 molar ratio), the composition of the catalyst, as well as the reaction conditions including temperature, pressure and reaction time. A skilled artisan is expected to have the competence to optimize the reaction conditions and yield.

The diolefin feed very suitably comprises compounds which are di-substituted with vinyl groups. However, not every compound containing two vinyl groups is a suitable monomer; for example, when a divinylester of a dicarboxylic acid is used, reaction occurs essentially in the form of hydroformylation, rather than polymerization.

Preferred monomers because of their easier conversion into polymer and sufficient availability, are diesters of acrylic acid. Alternatively, the diamides of acrylic acid may be used. These monomers may be prepared in sufficient purity from aliphatic or aromatic diols and/or diamines.

It is noted that the ester or amide products of alkylacrylic acids are included provided the optionally substituted alkyl does not sterically or electronically hinder the polymerization of the monomer. Accordingly, the esters of methacrylic acid or ethacrylic are suitable, whereas the esters of tert-butylacrylic acid or trifluoromethacrylic acid produce a low yield of polyketone polymer. Hence, the groups D are preferably hydrogen atoms or unsubstituted n-alkyl groups, particularly methyl or ethyl groups.

Catalysts useful in the preparation of polyketone polymers are known in the art. A preferred catalyst among the known catalysts is disclosed in U.S. Pat. No. 4,849,542, the disclosure which is herein incorporated by reference.

Such preferred catalyst compositions generally comprise a palladium and/or a palladium compound as Group VIII metal; a compound containing a non- or weakly coordinating anion such as an anion of an acid having a pKa of less than 3.5 (measured at 18° C. in aqueous solution), provided it is not a hydrohalogenic acid; and a bidentate ligand of the general formula $R^1R^2M—R—MR^3R^4$, in which M represents phosphorus arsenic or antimony, phosphorus being preferred; R represents a divalent organic bridging group having at least two carbon atoms in the bridge, none of these carbon atoms carrying substituents that may cause stearic hindrance; and in which $R^1$, $R^2$, $R^3$ and $R^4$ are identical or hydrocarbyl groups.

The source of palladium cation is preferably a palladium salt. Examples of salts include salts of nitric acid; sulfuric acid; sulphonic acids, for example chlorosulphonic acid, methanesulphonic acid, trifluoromethane sulphonic acid, t-butylsulphonic acid, p-toluenesulphonic acid, or a sulphonated ion exchange resin; and a carboxylic acid, for example an alkanoic acid such as acetic acid or trifluoro acetic acid. Since halide ions can be corrosive, the source of palladium cation is preferably not a halide.

The quantity of palladium cation is not critical. Preferably it is sufficient to provide in the range of from about $10^{-7}$ to $10^{-1}$ gram atoms of Pd per mole of olefinically unsaturated compound, more preferably from about $10^{-6}$ to $10^{-2}$.

The source of a diphosphine is conveniently the diphosphine itself, or an acid addition salt of the diphosphine. It may also be a complex of the diphosphine with palladium.

A formula of the preferred diphosphine to be used is $R^1R^2P—R—PR^3R^4$, wherein each of $R^1$, $R^2$, $R^3$ and $R^4$ independently represents an optionally substituted aliphatic group, suitably having from 1 to 20 carbon atoms, preferably from 1–10 carbon atoms, or one or both pairs of $R^1$ and $R^2$, and $R^3$ and $R^4$ independently represent an optionally substituted divalent aliphatic group and R is as previously defined. Preferred alkyl groups have 1–4 carbon atoms and include ethyl, n-propyl, i-butyl and n-butyl. Examples of suitable alkylene groups include hexamethylene and cyclooctylene.

When the alkyl group is said to be optionally substituted, it may be substituted by one or more substituents which do not adversely affect the catalytic activity of the system. Suitable substituents include halogen atoms, alkoxy groups, haloalkyl groups, haloalkoxy groups, acyl groups, acyloxy groups, amino groups, hydroxyl groups, nitrile groups, acylamino groups, and aryl groups.

The bridging group represented by R is preferably an alkylene group which is optionally interrupted by one or more oxygen and/or sulphur atoms, as in:

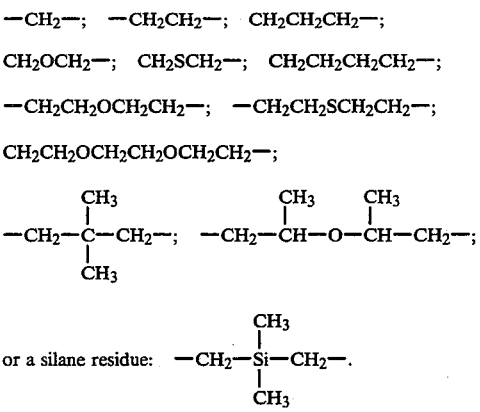

The bridging group preferably contains from 2 to 8 atoms in the bridge, more preferably from 3 to 5 atoms. For example, when the bridging group is a propane or neopentane residue, the bridge contains 3 atoms. Most preferably the bridging group is a trimethylene or tetramethylene group.

Examples of diphosphines which may be used in the polymerization according to the invention are: 1,2-bis(di-n-butylphosphino)ethane, 1,3-bis(dimethylphosphino)-propane, 1,3-bis(diethylphosphino)propane, 1,3-bis(di-i-propylphosphino)propane, 1,3-bis(di-n-propylphosphino)propane, 1,3-bis(di-i-butylphosphino)propane, and 1,4-bis(di-i-propylphosphino)butane.

The ratio of the number of moles of the diphosphine per gram atom of palladium is generally in the range of from about 0.50 to 10, preferably from about 0.9 to 5, and more preferably from about 1 to 3 moles/g atom of palladium.

The source of an anion used in the process of the invention is usually a protonic acid. However, as previously mentioned, it may also be a salt of palladium, or a salt of another metal, such as vanadium, chromium, nickel, copper or silver.

Typical non-coordinating anions, by which is meant that little or no covalent interaction occurs between palladium and the anion, include anions derived from an acids having a pKa below 3.5, preferably below 2, such as sulfuric acid; sulphonic acids, benzenesulphonic acid, p-toluenesulphonic acid, methanesulphonic acid, trifluoromethanesulphonic acid, perchloric acid, trichloroacetic acid, trifluoroacetic acid; or an acid derived by the interaction of a Lewis acid, such as $BF_3$, $PF_5$, $AsF_5$, with a Broensted acid, such as HF (e.g. fluorosilic acid, $HBF_4$, $HPF_6$, $HSbF_6$). The source of anions may also be an acidic ion exchange resin, for example a sulphonated ion exchange resin. Very suitable non-coordinating anions are $Ni(CF_3SO_2)_2$ or $Ni(ClO_4)_2$.

The number of moles of anion present in the polymerization mixture per gram atom of palladium present is not critical. Preferably the anion is present in a quantity of from 0.5 to 100, more preferably from 1 to 10 moles per gram atom palladium.

It is preferred that the catalyst system further comprises, as a promoter, a quinone. Examples of suitable quinone promoters include benzoquinones, such as 1,2-benzoquinone, 1,4-benzoquinone and tetrachloro-p-benzoquinone, and naphthoquinones, such as 1,2-naphthoquinone and 1,4-naphthoquinone.

The ratio of moles of quinone promoter to gram atom of palladium is not critical. Preferably it is in the range of from 1 to 1000, more preferably in the range of from 5 to 100.

The catalyst system according to the invention is preferably constituted in a liquid phase. The liquid phase may conveniently be formed by one or more of the reactants with which the catalyst system is to be used. Alternatively, it may be formed by a solvent. Said solvent may, for example, comprise dimethylsulphoxide, sulfolane, hexane, toluene, chloroform, 1,2-dichloroethane, ethyl acetate, acetone or 2,5,8-trioxanonane (also referred to as diglyme). The latter is a preferred solvent.

The process of this invention is conveniently carried out at a temperature in the range of from about 20° to 200° C., preferably from about 50° C. to 150° C., and a total pressure in the range of from about 2 to 100 bar. Pressures higher than 100 bar may be used, but are generally economically unattractive on account of special apparatus requirements. More preferred pressures are in the range of from about 5 to 70 bar, particularly from about 20 to 60 bar. Suitably, a molar ratio of carbon monoxide to hydrogen in the range of from about 0.5:1 to 3:1 can be used. It is observed that a surplus of hydrogen may promote hydrogenation to the detriment of polymerization. Preferably a molar ratio of carbon monoxide to hydrogen in the range of from about 1:1 to 2:1 is used. Most preferably, a molar ratio of monomer to carbon monoxide in the range of from about 0.1:1 to 2:1 is used. A suitable source of carbon monoxide and hydrogen is synthetic gas, or syn gas for short. The gaseous reactants may be diluted by an inert gas such as nitrogen. Also, the gaseous reactants may be introduced in one step, or added during the polymerization in a continuous fashion.

The process of the invention may be carried out batchwise, semi-continuously or continuously.

The polyketone polymer products may be isolated from the reaction mixture by any suitable manner, for example by means of precipitation, filtration, or extraction.

The following example further illustrates the invention, and is not to be construed as limiting the invention. The novel polyketone polymer is characterized by melting point, H-decoupled $^{13}$C-NMR (using a Brüker WM250 spectrometer), and molecular weight (NMR determined, based on relative end-group abundance).

Example 1

A polyketone polyester was produced from 1,4-butanediol diacrylate, CO and $H_2$ by charging under $N_2$ to a magnetically stirred 300 ml autoclave 40 ml of diglyme, 10 gr 1,4-butanediol diacrylate (50 mmol), and a catalyst formed from 0.25 mmol of $Pd(OAc)_2$, 0.6 mmol 1,3-bis(diethylphosphino)propane, 1.0 mmol of $Ni(CF_3SO_3)_2$ and 5 mmol of 1,4-naphthoquinone.

After the autoclave was sealed, the $N_2$ was removed by evacuation. Then the autoclave was charged with CO until a partial pressure of 30 bar was reached. Next, the autoclave was charged with $H_2$ until a partial pressure of 20 bar was reached, after which the autoclave was heated at 90° C. for 10 hours. The polymerization was terminated by cooling to room temperature and releasing the pressure. The polymer product was recovered by precipitation, washed with methanol and dried in vacuo at room temperature.

The yield of recovered polyketone polyester was 7.0 gr. It had a molecular weight about 2500, and a melting point range of from 75 to 80° C. The C-NMR spectrum showed resonance signals at 206.8 ppm (CO, relative intensity corresponding to 1 carbon atom); 172.5 ppm (CO of ester, 2C); 63.9 ppm (2C); 36.8 ppm (2C); 27.7 ppm (2C); and 25.1 ppm (2C) (chemical shifts relative to TMS). From the spectrum, it is deduced that in the polymer backbone the units originating from carbon monoxide, and the units originating from 1,4-butadediol diacrylate and hydrogen occur in a substantially alternating order.

This invention has been described in detail for the purpose of illustration, and it is not to be construed as limited thereby but is intended to cover all changes and modifications within the spirit and scope thereof.

What is claimed is:

1. Polyketone polymers comprising a repeating structure of the general formula

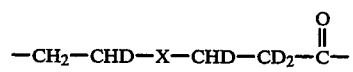

wherein each D, independently, represents a hydrogen atom or an alkyl group of up to 4 carbon atoms and X is a member of a divalent bridging group represented by the general formula:

wherein $R^5$ and $R^6$ independently are hydrogen or an alkyl group of up to 4 carbon atoms and B represents an inert divalent bridging group.

2. A polyketone polymer as in claim 1 wherein X is represented by the general formula (III) and wherein B is an n-alkylene group having from 2–10 carbon atoms.

3. A polyketone polymer as in claim 2 wherein B is a 1,4-butylene group.

4. A process for preparing polyketone polymers of claim 1 comprising polymerizing carbon monoxide and hydrogen with one or more diolefins of the general formula:

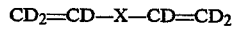

wherein X and D have the same meaning as defined in claim 1 and wherein said polymerization is carried out in the presence of a catalyst comprising a Group VIII metal; a bidentate ligand of the gneral formula $R^1R^2M$—R—$MR^3R^4$, in which M represents phosphorus, arsenic or antimony, R represents a divalent organic bridging group having at least two carbon atoms in the bridge, none of these carbon atoms carrying substituents that my cause stearic hinderance and $R^1$, $R^2$, $R^3$ and $R^4$ are identical or different hydrocarbyl groups; a weakly or non-coordinating anion and a quinone.

5. A process as in claim 4 wherein said Group VIII metal is palladium.

6. A process as in claim 4, wherein said non-coordinating anion is an anion of an acid having a pKa below 3.5.

7. A process as in claim 4 wherein said bidentate ligand is of the general formula $R^1R^2P$—R—$PR^3R^4$ in which R is a bridging group containing 3–5 atoms in the bridge and $R^1$, $R^2$, $R^3$ and $R^4$ are alkyl groups having 1–4 carbon atoms.

8. A process as in claim 4 wherein said polymerization is carried out at a temperature in the range of from 50° to 150° C. and at a pressure in the range of from 20 to 60 bar and wherein carbon monoxide and hydrogen are present at a molar ratio in the range of 1:1 to 2:1.

* * * * *